United States Patent
Takikawa et al.

(12) 
(10) Patent No.: US 6,759,024 B2
(45) Date of Patent: Jul. 6, 2004

(54) METHOD FOR MANUFACTURING NANO-TUBE, NANO-TUBE MANUFACTURED THEREBY, APPARATUS FOR MANUFACTURING NANO-TUBE, METHOD FOR PATTERNING NANO-TUBE, NANO-TUBE MATERIAL PATTERNED THEREBY, AND ELECTRON EMISSION SOURCE

(75) Inventors: Hirofumi Takikawa, Aza Uehara 1-3 (1-104), Ohgasaki-cho, Toyohashi-shi, Aichi-ken (JP); Yoshihiko Hibi, Toyohashi (JP)

(73) Assignees: Hirofumi Takikawa, Toyohashi (JP); Futaba Corporation, Mobara (JP)

( * ) Notice: Subject to any disclaimer, the term of this patent is extended or adjusted under 35 U.S.C. 154(b) by 0 days.

(21) Appl. No.: 09/989,024

(22) Filed: Nov. 21, 2001

(65) Prior Publication Data

US 2002/0061638 A1 May 23, 2002

(30) Foreign Application Priority Data

Nov. 21, 2000 (JP) ........................................ 2000-353659

(51) Int. Cl.⁷ .......................... C10B 31/26; D01F 9/12; H01L 51/20
(52) U.S. Cl. .............................. 423/445 B; 423/447.1; 423/447.3; 257/E51.04
(58) Field of Search .............................. 423/447.1, 445, 423/447.3

(56) References Cited

U.S. PATENT DOCUMENTS 6,156,994 A * 12/2000 Apunevich et al. ..... 219/121.46
6,517,800 B1 * 2/2003 Cheng et al. ............ 423/447.1

FOREIGN PATENT DOCUMENTS

JP     11-263609    *   9/1999
JP     2000-86219    *   3/2000

* cited by examiner

*Primary Examiner*—Wael Fahmy
*Assistant Examiner*—Shrinivas H Rao
(74) *Attorney, Agent, or Firm*—Oblon, Spivak, McClelland, Maier & Neustadt, P.C.

(57) ABSTRACT

A method of instantaneously forming a surface of an arc-treated material mainly including graphite into nano-tubes due to arc discharge carried out using a unit like a welding arc torch or the like without necessarily requiring a processing container, resulting in the nano-tube being applied to an electron emission source. A torch electrode acting as a first electrode and the arc-treated material made of graphite and acting as a second electrode are arranged opposite to each other. A potential is applied between both electrodes to generate arc discharge therebetween. A mask having an opening pattern is arranged on the arc-treated material, so that only graphite positioned on portions of a surface of the arc-treated material corresponding to openings of the mask are exposed to arc, to thereby be formed into nano-tubes.

18 Claims, 6 Drawing Sheets

METHOD FOR MANUFACTURING NANO-TUBE, NANO-TUBE MANUFACTURED THEREBY, APPARATUS FOR MANUFACTURING NANO-TUBE, METHOD FOR PATTERNING NANO-TUBE, NANO-TUBE MATERIAL PATTERNED THEREBY, AND ELECTRON EMISSION SOURCE

BACKGROUND OF THE INVENTION

This invention relates to nano-tube techniques, and more particularly to a method for manufacturing a nano-tube, a nano-tube manufactured thereby, an apparatus for manufacturing a nano-tube, a method for pattering a nano-tube, a nano-tube material patterned thereby, and an electron emission source having a patterned nano-tube material incorporated therein.

A field electron emission source is generally reduced in consumption of energy and increased in durability as compared with a thermion emission source which requires heating.

Materials currently used for manufacturing a field electron emission source include a semiconductor such as silicon or the like and metal such as Mo, W or the like, as well as a nano-tube. In particular, the nano-tube has a size and sharpness sufficient to permit concentration of an electric field and is chemically stable and increased in mechanical strength, resulting in being expected to provide a promising field electron emission source.

A nano-tube has been conventionally manufactured by laser abrasion, arc discharge between graphite electrodes in an inert gas atmosphere, chemical vapor deposition (CVD) using hydrocarbon gas or the like. In particular, a nano-tube manufactured by arc discharge techniques is reduced in defect in atomic arrangement, to thereby be particularly suitable for use for a field electron emission source.

Now, the conventional arc discharge techniques will be described.

A pair of graphite electrodes are arranged in a container in a manner to be opposite to each other and then the container is evacuated. Then, inert gas is introduced into the container and arc discharge is carried out therein. This results in an anode highly evaporating, to thereby produce soot, which is then deposited on a surface of a cathode. Generation of the arc is continued for several minutes or more. Then, the apparatus is caused to communicate with an ambient atmosphere, followed by removal or recovery of the thus-deposited material or cathode deposit from the cathode.

The cathode deposit is constituted by a soft core containing a nano-tube and a hard shell free of a nano-tube.

When the anode is made of graphite containing a metal catalyst, a nano-tube is contained in the soot.

Thereafter, the nano-tube is removed from the soft core and/or soot and then carried on a substrate so as to act as an electron emission source.

However, manufacturing of the nano-tube by arc discharge and manufacturing of the electron emission source which have been conventionally carried out cause problems.

More particularly, the prior art requires a vacuum container, a vacuum evacuation unit and an inert gas introduction unit, resulting in being relatively increased in equipment cost.

Another disadvantage of the prior art requires to repeat the evacuation and atmospheric communication, so that the prior art is time-consuming.

Also, the prior art requires recovery of the cathode deposit and/or soot and cleaning of the equipment after completion of the process, to thereby be unsuitable for continuous mass production of the nano-tube.

Further, manufacturing of the nano-tube produced by the prior art into the electron emission device has a disadvantage. More particularly, it requires many additional steps such as separation of the soft core and hard shell from each other, isolation of the nano-tube from the soot, purification of the nano-tube, carrying of the nano-tube on the substrate, and the like.

SUMMARY OF THE INVENTION

The present invention has been made in view of the foregoing disadvantage of the prior art.

Accordingly, it is an object of the present invention to provide a method for manufacturing a nano-tube which is capable of being highly readily practiced and suitable for continuous mass-production of the nano-tube.

It is another object of the present invention to provide a method for manufacturing an electron emission source which is capable of being readily practiced and suitable for continuous mass-production thereof.

It is a further object of the present invention to provide an apparatus for manufacturing a nano-tube which is capable of readily manufacturing a nano-tube.

It is still another object of the present invention to provide an apparatus for manufacturing a nano-tube which is capable of accomplishing mass-production of a nano-tube.

It is yet another object of the present invention to provide a method for manufacturing an electron emission source which is capable of readily manufacturing an electron emission source.

It is even another object of the present invention to provide an apparatus for manufacturing an electron emission source which is capable of attaining mass-production of an electron emission source.

It is another object of the present invention to provide a method for patterning a nano-tube material which is capable of readily patterning a nano-tube material with reliability.

It is a still further object of the present invention to provide a nano-tube which is capable of being readily manufactured.

It is a yet further object of the present invention to provide a nano-tube material which is capable of being readily and satisfactorily patterned.

In accordance with one aspect of the present invention, a method for manufacturing a nano-tube is provided. The method includes the step of arranging a first electrode and a second electrode in a manner to be opposite to each other in an air atmosphere. The second electrode is made of a material mainly consisting of a carbon material. The method also includes the steps of applying a voltage between the first electrode and the second electrode to carry out arc discharge therebetween and forming a carbon material on a predetermined region of the second electrode into a nano-tube due to the arc discharge.

In a preferred embodiment of the present invention, the first electrode is constituted by a torch electrode provided at an arc torch. The step of forming the carbon material on the predetermined region of the second electrode into the nano-tube due to the arc discharge is carried out while moving the torch electrode and second electrode relatively to each other.

In a preferred embodiment of the present invention, the second electrode is arranged on a surface of a substrate. The step of forming the carbon material on the predetermined region of the second electrode into the nano-tube due to the arc discharge is carried out while holding the substrate on a cooling member to cool the substrate through the cooling member.

In a preferred embodiment of the present invention, the step of forming the carbon material on the predetermined region of the second electrode into the nano-tube due to the arc discharge is carried out while surrounding at least the first electrode, the second electrode, and an arc discharge region between the first electrode and the second electrode with a surrounding member.

In a preferred embodiment of the present invention, the carbon material for the second electrode is any one selected from the group consisting of graphite, carbon, activated carbon, amorphous carbon and graphite.

In a preferred embodiment of the present invention, the carbon material for the second electrode is any one selected from the group consisting of a carbon material containing a metal catalyst, that having a metal catalyst formed on a surface thereof, that containing B and a metal catalyst, that having B formed on a surface thereof and that having B and a metal catalyst formed on a surface thereof.

In a preferred embodiment of the present invention, the metal catalyst is selected from the group consisting of Li, B, Mg, Al, Si, P, S, K, Ca, Ti, V, Cr, Mn, Fe, Co, Ni, Cu, Zn, Ga, Ge, As, Y, Zr, Nb, Mo, Rh, Pd, In, Sn, Sb, La, Hf, Ta, W, Os, Pt, an oxide thereof, a nitride thereof, a carbide thereof, a sulfide thereof, a chloride thereof, a sulfate thereof, a nitrate thereof and a mixture thereof.

In a preferred embodiment of the present invention, the arc discharge is carried out while feeding specific gas to a region in which the arc discharge is generated.

In a preferred embodiment of the present invention, the specific gas is selected from the group consisting of rare gas such as Ar, He or the like, air, nitrogen gas, carbon dioxide gas, oxygen gas, hydrogen gas and a mixture thereof.

In a preferred embodiment of the present invention, the first electrode is made of a material mainly consisting of graphite, activated carbon and amorphous carbon.

In a preferred embodiment of the present invention, the arc discharge is generated by a DC or a DC pulse. The second electrode acts as an anode for the arc discharge.

In a preferred embodiment of the present invention, the arc discharge is generated by an AC or an AC pulse.

In accordance with another aspect of the present invention, a nano-tube is provided. The nano-tube is manufactured according to the method described above.

In accordance with a further aspect of the present invention, an apparatus for manufacturing a nano-tube is provided. The apparatus includes a first electrode and a second electrode arranged in a manner to be opposite to each other in an air atmosphere. The second electrode is made of a material mainly consisting of a carbon material, that containing a metal catalyst and that having a metal catalyst formed on a surface thereof. Also, the apparatus includes an arc generation means including a power supply for applying a voltage between the first electrode and the second electrode to generate arc discharge with respect to a predetermined region of the second electrode, resulting in a carbon material in the predetermined region being formed into a nano-tube due to the arc discharge, and a specific gas feed means for feeding specific gas to a region in which the arc discharge is generated.

In a preferred embodiment of the present invention, the first electrode is constituted by a torch electrode provided at an arc torch. The apparatus further includes a transfer means for moving the torch electrode and second electrode relatively to each other, so that a voltage is applied between the torch electrode and the second electrode while moving the torch electrode and second electrode relatively to each other, to thereby generate arc discharge with respect to a predetermined region of the second electrode, resulting in a carbon material on the predetermined region being formed into a nano-tube due to the arc discharge.

In a preferred embodiment of the present invention, the second electrode is arranged on a substrate. The apparatus further includes a holding means for holding the first electrode and second electrode while keeping the first electrode and second electrode spaced from each other at a predetermined interval. The holding means includes a cooling means for cooling the substrate.

In a preferred embodiment of the present invention, the apparatus further includes a surrounding means for surrounding at least the first electrode, the second electrode and an arc discharge region in which the arc discharge is generated between the first electrode and the second electrode.

In accordance with still another aspect of the present invention, a method for patterning a nano-tube is provided. The method includes the step of arranging a first electrode and a second electrode in a manner to be opposite to each other in an air atmosphere. The second electrode is made of a material mainly consisting of a carbon material. The method further includes the steps of applying a voltage between the first electrode and the second electrode to generate arc discharge therebetween; and forming a carbon material on a predetermined region of the second electrode into a nano-tube due to the arc discharge while moving the first electrode and second electrode relatively to each other.

In accordance with yet another aspect of the present invention, a method for patterning a nano-tube is provided. The method includes the step of arranging a first electrode and a second electrode in a manner to be opposite to each other in an air atmosphere. The second electrode is made of a material mainly consisting of a carbon material selected from the group consisting of a carbon material formed into any pattern-like shape, that containing a metal catalyst formed into any pattern-like shape and that having a metal catalyst formed into any pattern-like shape on a surface thereof; applying a voltage between said first electrode and said second electrode to generate arc discharge therebetween; and forming a carbon material on a predetermined region of the second electrode into a nano-tube due to the arc discharge.

In accordance with a still further aspect of the present invention, a method for patterning a nano-tube is provided. The method includes the steps of arranging a first electrode and a second electrode in a manner to be opposite to each other in an air atmosphere; arranging a mask of any opening pattern on a surface of the second electrode; applying a voltage between the first electrode and the second electrode to generate arc discharge therebetween; and forming a carbon material on a predetermined region of the second electrode corresponding to openings of the mask into a nano-tube.

In a preferred embodiment of the present invention, the first electrode is constituted by a torch electrode provided at an arc torch.

In accordance with a yet further aspect of the present invention, a nano-tube material is provided. The nano-tube material is patterned according to the patterning method described above.

In accordance with an even further aspect of the present invention, an electron emission source is provided. The electron emission source has the patterned nano-tube material described above incorporated therein.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals designate like or corresponding parts throughout; wherein.

DETAILED DESCRIPTION OF THE PREFERRED EMBODIMENT

Now, the present invention will be described hereinafter with reference to the accompanying drawings.

The term "nano-tube" as used herein is intended to cover a carbon nano-tube, a carbon nano-fiber, a carbon nano-particle, a nano-horn, a CN nano-tube, a CN (nano-)fiber, a CN nano-particle, a BCN nano-tube, a BCN (nano)fiber, a BCN nano-particle, and a mixture thereof.

Figure 1:
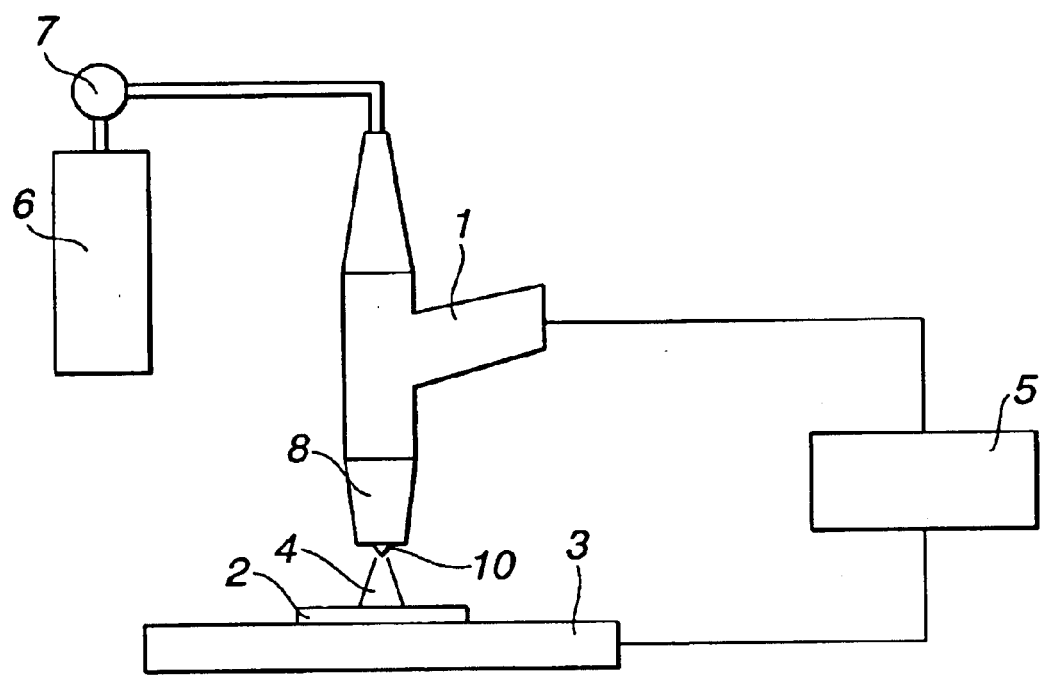
FIG. 1 is a schematic view showing an apparatus for manufacturing (patterning) a nano-tube according to the present invention.

Referring first to FIG. 1, a manufacturing (patterning) apparatus used for practicing each of a method for patterning a nano-tube, a method for manufacturing a nano-tube, a nano-tube, a nano-tube material, and a method for manufacturing an electron emission source according to an embodiment of the present invention is schematically illustrated by way of example.

In the illustrated embodiment, arc discharge is carried out for a short period of time on a material to be subjected to an arc discharge treatment (hereinafter referred to as "arc-treated material") in either an air atmosphere or a predetermined gas atmosphere by means of a general-purpose arc torch for welding such as TIG (tungsten inert gas) welding or the like (inert gas arc welding) and a power supply (welding power supply). A MIG (metal-electrode-inert-gas) arc torch may be substituted for the TIG arc torch.

TIG welding is carried out by generating arc discharge between a non-consumable tungsten (W) electrode and a matrix in an inert gas atmosphere while using filler metal as required.

The apparatus of the illustrated embodiment, as shown in FIG. 1, includes an arc torch 1 for welding including a torch electrode 10 acting as a first electrode and an arc-treated material 2 arranged opposite to the arc torch 1 so as to act as a second electrode 2, a water-cooled bench 3 for holding the arc-treated material 2 thereon, a power supply 5 for applying a voltage between the arc torch 1 and the arc-treated material 2 to generate arc 4 therebetween, a gas bomb 6 acting as a gas feed source for feeding predetermined gas to the arc torch 1, and a gas regulator/flow meter 7 for adjusting and/or controlling a flow rate of gas fed from the gas bomb 6. Application of a voltage between the arc torch 1 and the arc-treated material 2 is carried out by, for example, contact ignition, high-voltage application, radiofrequency application or the like. Reference numeral 8 designates a distal end of the arc torch 1.

Figure 2:
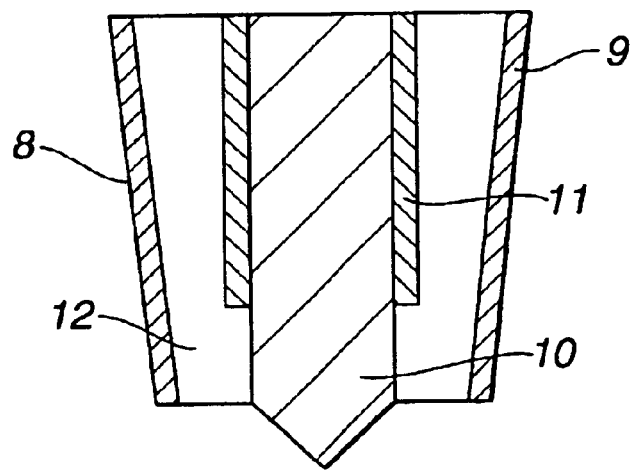
FIG. 2 is a fragmentary enlarged sectional view of the nano-tube manufacturing (patterning) apparatus shown in FIG. 1.

The distal end 8 of the arc torch 1 in the nano-tube manufacturing (patterning) apparatus is constructed in such a manner as shown in FIG. 2. More particularly, the distal end 8 of the arc torch 1 is constituted by a nozzle 9 of the arc torch 1, the torch electrode 10 made of W or the like and acting as the first electrode, an electrode holder 11 for holding the torch electrode 10 therein, and a space defined between the nozzle 9 and the electrode holder 11 and acting as a flow path through which surrounding gas 12 is fed to the arc 4 generated between the arc torch 1 and the arc-treated material 2.

The general-purpose TIG welding power supply 5 is constructed so as to feed the gas 12 to the arc torch 1. In general, argon (Ar) gas is fed for this purpose. However, in manufacturing of the nano-tube, the gas used is not limited to any specific type. Thus, the gases used for this purpose include, for example, inert gas such as Ar, helium (He) or the like, air, nitrogen (N2) gas, carbon oxide gas such as carbon dioxide (CO2) gas or the like, oxygen (O2) gas, hydrogen (H2) gas, and a mixture thereof. Alternatively, the gas may not be fed. However, the gas 12 is preferably fed to the arc torch 12. In particular, feeding of the inert gas to the arc torch 12 prevents any chemical reaction between the nano-tube and the inert gas, to thereby minimize breakage of the nano-tube. Thus, most preferably the inert gas is fed to the arc torch 12.

Thus, essentially the illustrated embodiment eliminates use of any container. However, when it is desired to carry out the welding in an inert gas atmosphere in order to keep an operation place clean or when it is desired to eliminate an effect of convection due to a wind or the like, the welding may be carried out in a simple container acting as a surrounding means. Either a vacuum container or a pressurized container may be used for this purpose. Also, the container may be of either the closed-type or the open-type. A pressure in the container is not limited to any specific magnitude. The pressure is preferably at a level near an atmospheric pressure in order to ensure good operability.

In the conventional TIG welding, a thorium (Th)- or cerium (Ce)-containing W electrode may be used as a torch electrode. In manufacturing of the nano-tube, such an electrode may be used as the torch electrode 10. However, in order to avoid that a fine molten particle adheres in the form of a droplet to the arc-treated material 2, pure graphite is preferably used for the torch electrode 10. The torch electrode 10 is not limited to any specific diameter. When a general-purpose torch is used for this purpose, the diameter is preferably within a range of between 1 mm and 7 mm.

The electrode holder 11 made of metal is desirably cooled with water as in the general-purpose TIG welding torch.

When the arc is continuously generated or intermittently generated for a long period of time in order to synthesize a nano-tube of a large area or continuously carry out mass-production of a nano-tube, the torch electrode 10 acting as the first electrode and the electrode holder 11 are excessively heated. This may possibly cause the torch electrode 10 to be highly exhausted and the electrode holder 11 to be damaged. Thus, when cooling of the electrode holder 11 due to flowing of the gas (specific gas) 12 through the arc torch 1 leads to cooling of the electrode holder 11, the electrode holder 11 is prevented from being damaged by heating. Also, this permits the torch electrode 11 to be cooled by the electrode holder 11 being cooled, resulting in minimizing exhaustion of the torch electrode 10.

The arc-treated material 2 which mainly consists of a carbon material formed into the nano-tube or contains the carbon material in a large amount acts as a counter electrode for the torch electrode 10. The carbon materials suitable for use for this purpose include graphite, activated carbon, amorphous carbon and the like. The arc-treated material 2 is limited to any specific size. However, a thickness thereof is preferably within a range of between 0.1 mm and 5 mm.

Also, in order to protect the arc-treated material 2 from heat of the arc 4 or minimize breakage of the arc-treated material 2 due to heat of the arc 4, the arc-treated material 2 is preferably cooled. For this purpose, the operation is preferably carried out on the water-cooled bench 3 which is an electrode support water-cooled. The arc-treated material 2 may be kept sufficiently dried or contain moisture. When the arc-treated material 2 contains moisture, energy of the arc 4 is consumed to evaporate the moisture, to thereby fail to permit a temperature of the arc-treated material 2 which is to be evaporated to be increased to a desired level. Thus, the arc-treated material 2 is preferably kept dried. Nevertheless, when the arc-treated material 2 is wetted, is moistened, contains moisture or is placed in water, the arc-treated material 2 may be prevented from being heated due to the arc 4. Heating of the arc-treated material 2 also may be prevented by directly cooling the arc-treated material 2 with water, oil or the like. Further, the cooling may be carried out by blowing a cooling medium such as water, carbon dioxide gas or the like against the arc-treated material 2 or spraying it thereon.

A period of time for which arc discharge is carried out may be set to be as short as three (3) seconds or less. Arc discharge for more than three seconds causes the arc-treated material 2 to be evaporated, leading to a deterioration in flatness thereof, resulting in a nano-tube produced being unsuitable for use for an electron emission source, although it permits production of a nano-tube. Also, an arc current required for the arc discharge may be set to be within a wide range of between 5 A and 500 A. In order to prevent breakage of the arc-treated material 2, it is preferably set at a level between 30 A and 300 A. When the arc 4 is generated by means of a pulse current, the current is not limited to any specific level. However, it is preferably at a level between 1 Hz and 500 Hz in view of a general-purpose power supply. A distance between the arc torch 1 and the arc-treated material 2 may be determined to be between 0.1 mm and 10 mm.

When the arc discharge is carried out by means of a DC or a DE pulse, conditions for forming a nano-tube on a surface of pure graphite are highly restricted. However, use of graphite containing a metal catalyst or the like for the arc-treated material 2 permits a large amount of nano-tubes to be produced on a surface thereof. The metal catalysts include Li, B, Mg, Al, Si, P, S, K, Ca, Ti, V, Cr, Mn, Fe, Co, Ni, Cu, Zn, Ga, Ge, As, Y, Zr, Nb, Mo, Rh, Pd, In, Sn, Sb, La, Hf, Ta, W, Os, Pt and a mixture thereof.

The metal catalyst may be contained in the form of elemental metal, an oxide thereof, a nitride thereof, a carbide thereof, a sulfide thereof, a chloride thereof, a sulfate thereof, a nitrate thereof or the like in the graphite. Alternatively, the metal catalyst may be sprayed, coated, plated, deposited or impregnated on a surface of the graphite while being in the form of an elemental metal, an oxide, a nitride, a carbide, a sulfide, a chloride, a sulfate, a nitrate or the like. Thus, it is merely required that the arc-treated material 2 is constructed so as to permit the graphite and metal catalyst to be concurrently heated by the arc 4.

When the arc 4 is generated by means of an AC or an AC pulse, use of pure graphite as well permits a large amount of nano-tubes to be formed on a surface thereof. Also, the above-described graphite electrode containing or covered with the metal catalyst likewise permits a large amount of nano-tubes to be produced. Rather, the pure graphite electrode leads to an increase in density of nano-tubes per unit plane as compared with the graphite electrode containing or covered with the catalyst.

Now, a manner in which at least one desired site or portion on a surface of the arc-treated material 2 is concurrently formed into nano-tubes will be described with reference to FIGS. 3 and 4 by way of example. For this purpose, the arc 4 is generated between the arc-treated material 2 and the torch electrode 10 through a mask 13 formed into a pattern corresponding to portions of the surface of the arc-treated material 2 to be formed into nano-tubes.

Figure 3:
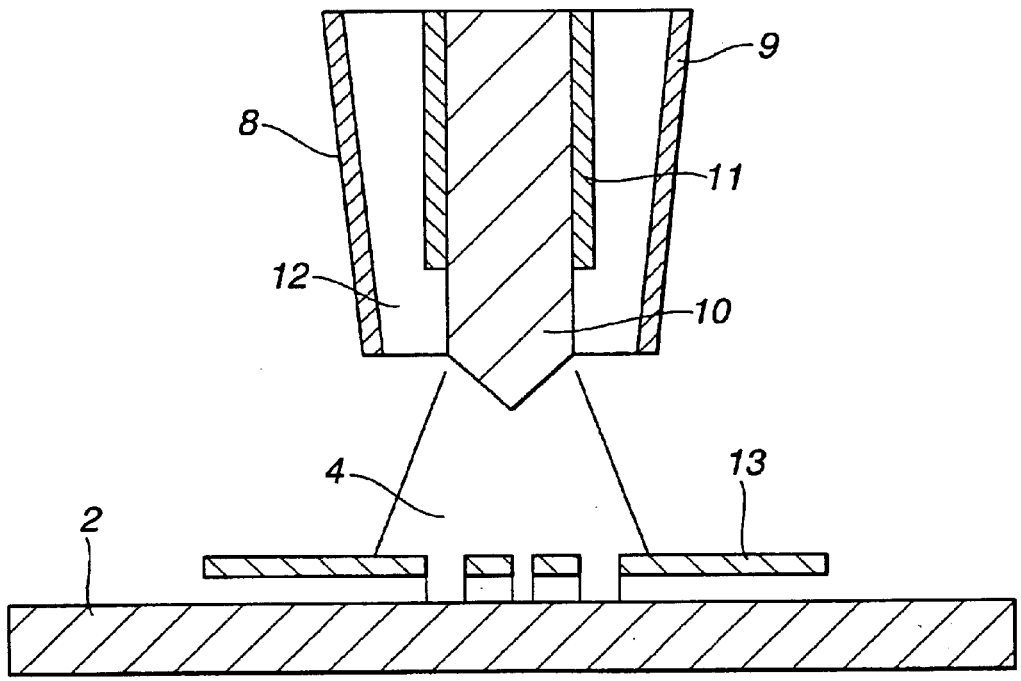
FIG. 3 is a sectional view schematically showing formation (patterning) of nano-tubes at a specific site on an arc-treated material by way of example.
Figure 4:
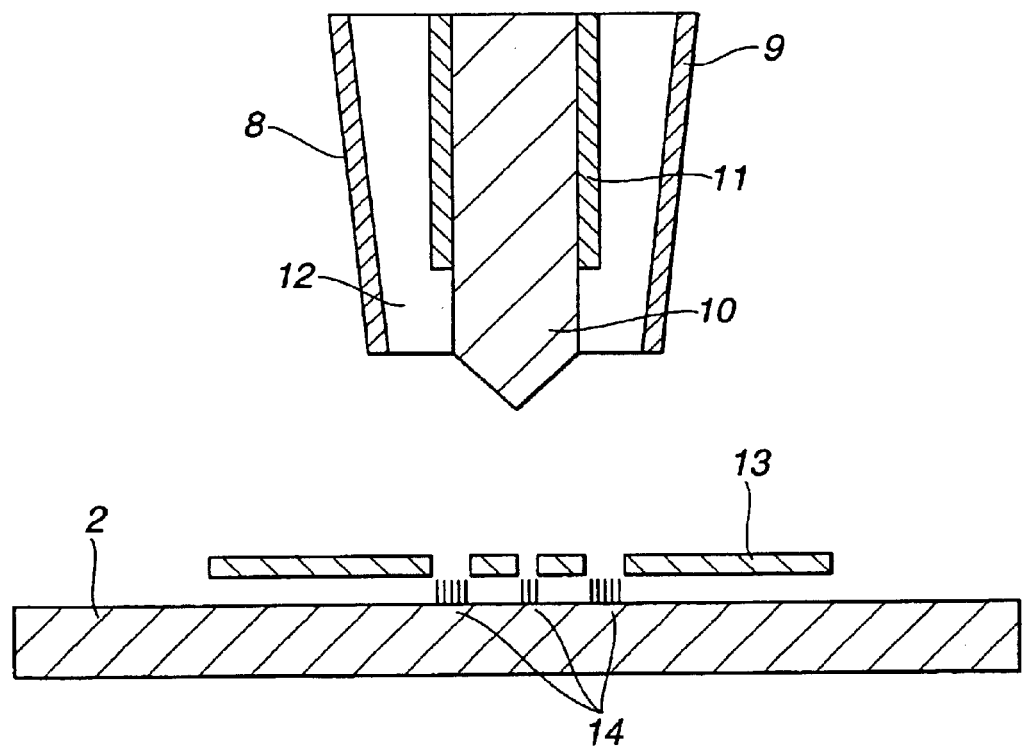
FIG. 4 is a sectional view schematically showing nano-tubes grown in the formation shown in FIG. 3.

FIG. 3 shows arc discharge carried out between the arc-treated material 2 and the torch electrode 10 and FIG. 4 shows nano-tubes grown by the arc discharge shown in FIG. 3. In FIG. 4, reference numeral 14 designates sites or portions of the arc-treated material on which nano-tubes are grown.

Nano-tubes are formed on only portions of the surface of the arc-treated material 2 with which the arc 4 is contacted. The mask 13 may be made of any suitable material which is resistant to a high temperature and heat shock, such as, for example, high-melting metal, ceramics, graphite or the like. Also, the mask 13 may be placed directly on the arc-treated material 2 or arranged through a spacer thereon so as to be slightly spaced from the arc-treated material.

When the AC or AC pulse is used for the arc discharge, the arc-treated material 2 may be made of pure graphite, graphite containing a metal catalyst or the like, or graphite having a metal catalyst sprayed, coated, plated or deposited thereon. DC arc or DC pulse arc causes pure graphite to be excluded from use for the arc-treated material 2. Instead, graphite containing a metal catalyst or the like or that having a metal catalyst sprayed, coated, plated or deposited thereon may be applied for this purpose.

Now, another manner in which at least one desired site or portion on a surface of the arc-treated material 2 is concurrently formed into nano-tubes will be described with reference to FIGS. 5 to 7. In this case, a portion of a surface of graphite which is desired to be formed into nano-tubes has the metal catalyst 15 or the like sprayed, coated, plated or deposited thereon.

Figure 5:
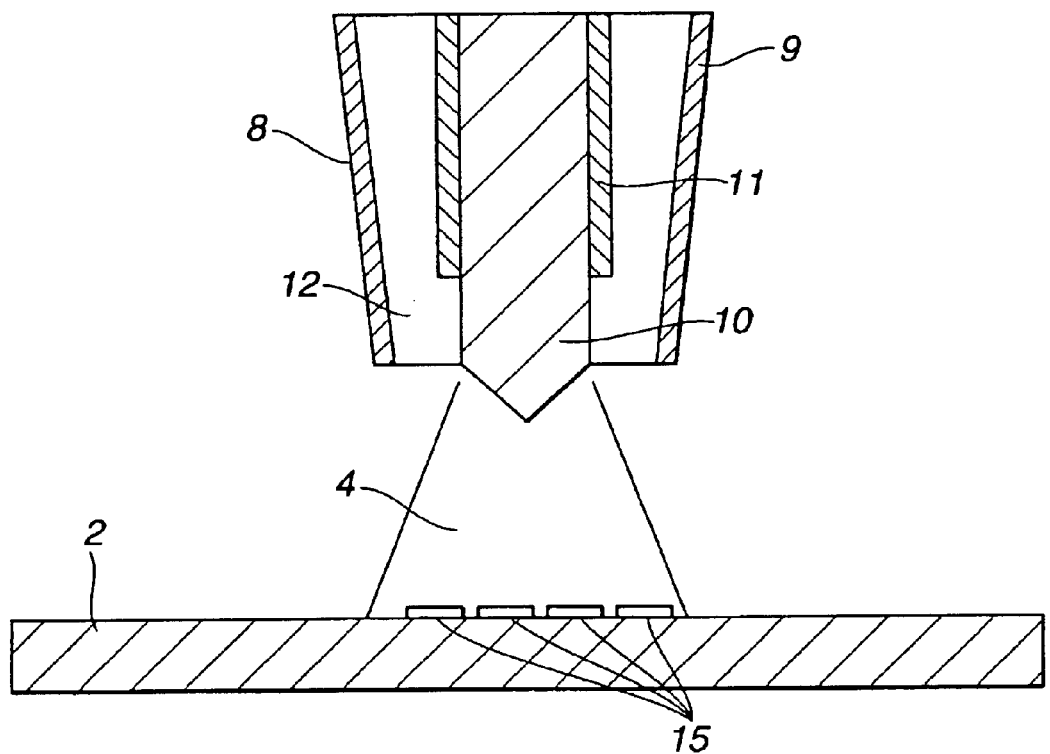
FIG. 5 is a sectional view schematically showing another example of formation (patterning) of nano-tubes at a specific site on an arc-treated material.
Figure 6:
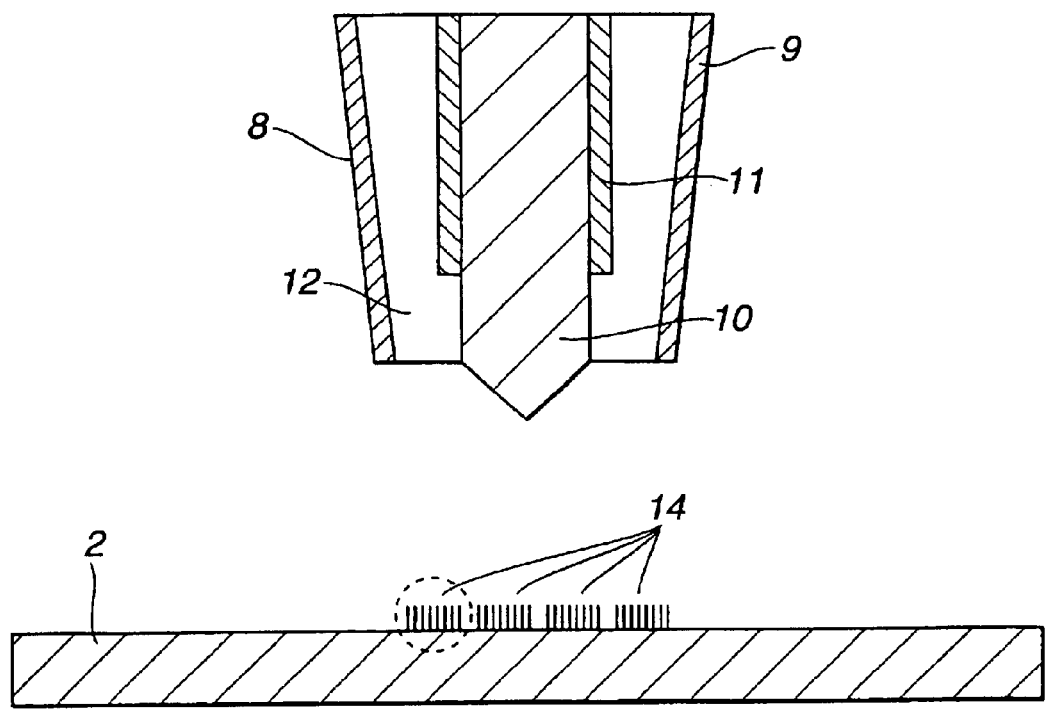
FIG. 6 is a sectional view schematically showing nano-tubes grown in the formation shown in FIG. 5.

FIG. 5 shows generation of arc 4 carried out between the arc-treated material 2 and the torch electrode 10 and FIG. 6 shows nano-tubes grown by arc discharge shown in FIG. 5. In FIG. 6, reference numeral 14 designates sites or portions of the arc-treated material 2 on which nano-tubes are grown. FIG. 7 is an enlarged view of a part encircled by dotted lines in FIG. 6.

Figure 7:
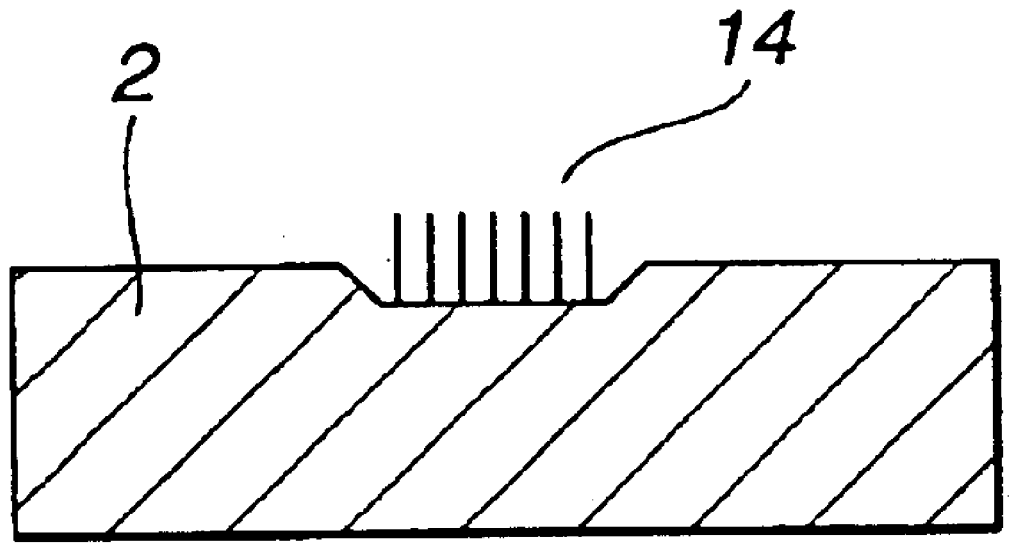
FIG. 7 is an enlarged view showing a part encircled by dotted lines in FIG. 6.

As shown in FIG. 7, the metal catalyst 15 is substantially lost from the surface of the arc-treated material 2 by processing using the arc discharge 4. More particularly, the processing permits the arc-treated material 2 to be formed on the surface thereof with a recess of a small depth, in which nano-tubes are formed.

Use of DC arc or DC pulse arc permits formation of nano-tubes on a portion of the surface of the arc-treated material 2 covered with the metal catalyst 15 or the like. However, no nano-tube is substantially formed on a portion of the surface of the arc-treated material which is not covered with the metal catalyst 15. In this method, it is not preferable to use AC arc or AC pulse arc, because nano-tubes are formed on the portion of the surface of the arc-treated material 2 which is not covered with the metal catalyst 15 as well. The method is simply practiced as compared with the method shown in FIG. 3, because the former does not use the mask 13 during the arc discharge.

The method of the present invention leads to continuous manufacturing of nano-tubes by successive replacement of the arc-treated material 2. Alternatively, the continuous manufacturing may be carried out by moving the arc torch while keeping the arc-treated materials juxtaposed to each other.

More particularly, the continuous manufacturing may be carried out by moving the arc-treated materials 2 while keeping the arc torch 1 stationary or by moving the arc torch 1 while keeping the arc-treated material 2 stationary. Alternatively, it may be carried out moving both the arc torch 1 and arc-treated materials 2.

Relative movement between the arc torch 1 and the arc-treated material 2 may be effected either manually or by means of a transfer means for moving the arc torch three-dimensionally or in X and Y directions parallel to the arc-treated direction and a Z direction vertical to the X and Y directions.

In particular, use of an numerical control (NC) apparatus or the like permits only a region of the surface of the arc-treated material 2 which is desired to formed into nano-tubes to be exposed to the arc 4. Also, it permits only a patterned portion of the metal catalyst 15 to be exposed to the arc 4.

In the above-described nano-tube manufacturing, use of air or nitrogen as gas to be fed to the arc torch 1 permits formation of a so-called CN nano-tube which is a carbon nano-tube containing nitrogen (N). Also, use of graphite which contains a boron (B)-containing material as the arc-treated electrode leads to formation of a so-called BCN nano-tube which is a nano-tube containing a BCN network. Such a BCN nano-tube may be likewise produced by using graphite containing a metal catalyst (additive) or the like, that having a B-containing material sprayed, coated, plated or deposited thereon or that having a B-containing material and an additive-containing material sprayed, coated, plated or deposited thereon as the arc-treated electrode 2. Likewise, a variation in atmospheric gas or additive leads to formation of a variety of nano-tubes. C indicates carbon.

Further, when nano-particles which deteriorate emission of electrons are removed from an electron emission source including the nano-tube manufactured as described above by oxidation, the electron emission source is permitted to be increased in performance.

The nano-tube produced by the method of the present invention may be applied to a conventional diode-type or triode-type electron emission source. In particular, it may be suitably used for a display tube, a display panel, a luminous device, a luminous tube, a luminous panel or the like. Further, the electron emission source permits the nano-tube produced on a specific site on the arc-treated material to emit electrons, to thereby be applied to a display device of a complicated pattern.

Now, results of an experiment made by the inventors will be described with reference to FIGS. 8 and 9.

Figure 8:
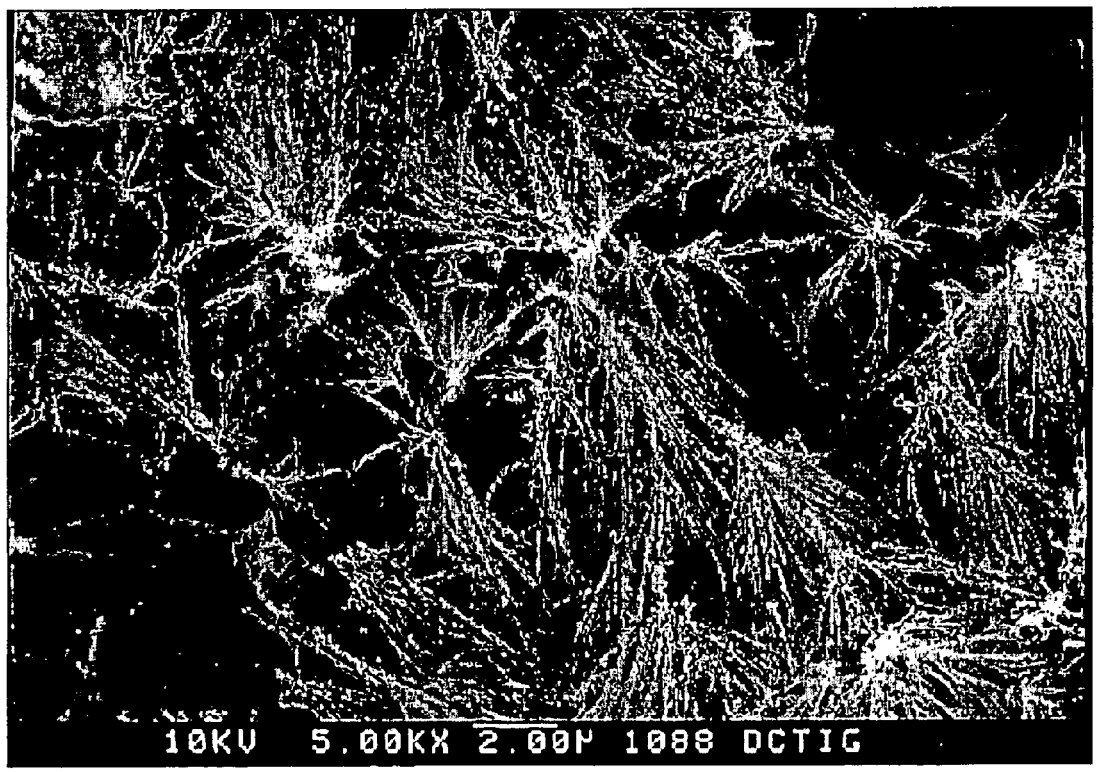
FIG. 8 is a microphotograph showing a nano-tube formed on a surface of graphite containing metal Ni/Y by DC arc techniques.

FIG. 8 is a microphotograph by a scanning electron microscope showing a surface of a Ni/Y-containing graphite plate (content of Ni: 4.2 wt %, content of Y: 1.0 wt %, plate thickness: 2 mm) processed in an open air atmosphere using the general-purpose welding arc torch 1 (torch electrode 10: graphite). An arc current was set to be 100 A. FIG. 8 indicates that a large amount of nano-tubes overlie the surface of the graphite plate.

Figure 9:
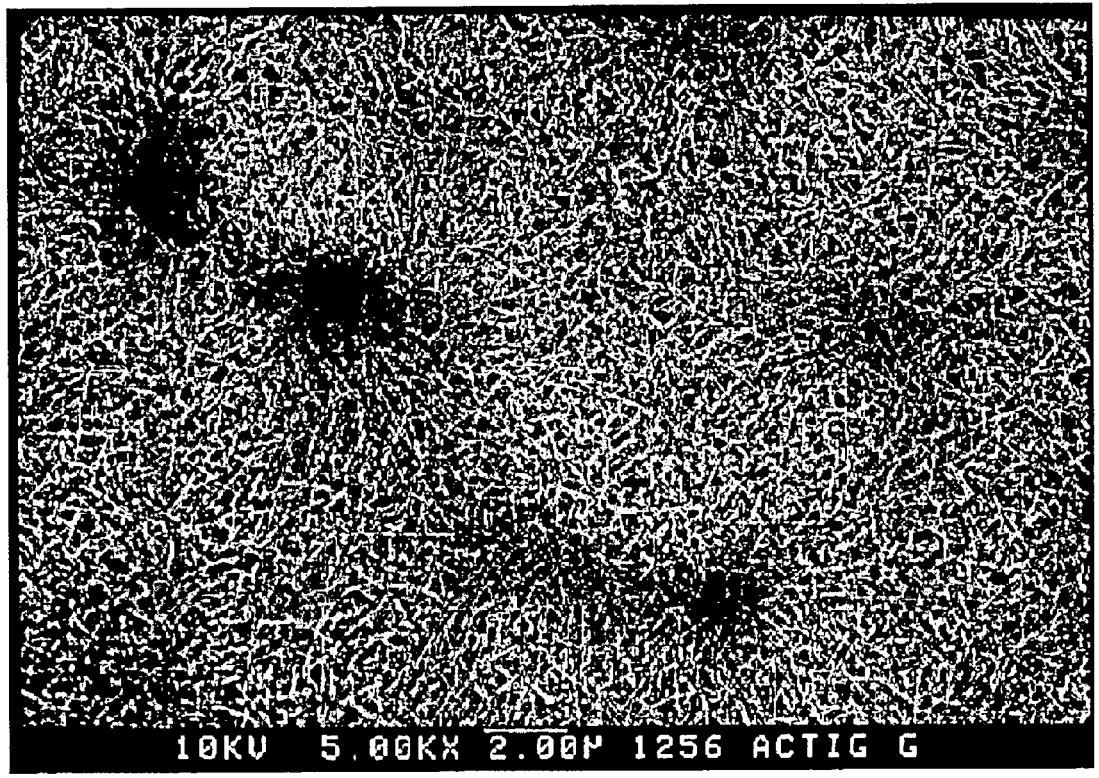
FIG. 9 is a microphotograph showing a nano-tube formed on a surface of graphite containing metal Ni/Y by AC arc techniques.

FIG. 9 is a microphotograph showing a surface of pure graphite subjected to AC arc discharge at 100 A. FIG. 9 likewise indicates that a large amount of nano-tubes overlie the surface of the graphite plate. It was found that the deposit thus formed on the surface contained single-layer carbon nano-tubes, nano-horns and the like. The deposit was then used for manufacturing of a diode-type fluorescent display device. Then, the display device was driven to emit electrons, which were impinged on a fluorescent luminous plane of the display device. As a result, it was observed that the fluorescent luminous plate emitted light.

In the embodiment described above, the graphite plate is used as the arc-treated material 2 having the graphite (second electrode) formed thereon. Thus, the substrate acts as the second electrode as well. Alternatively, the substrate and second electrode may be formed separately from each other. For example, a graphite layer may be arranged all over a metal plate or patterned thereon.

Alternatively, the embodiment may be so constructed that the graphite layer may be arranged in a solid pattern on an insulating plate such as a glass substrate, a ceramic substrate or the like or patterned thereon. In this case, metal may be interposed wholly between the insulating plate and the graphite layer or patterned therebetween. A metal material which does not evaporate during the arc discharge, such as aluminum may be used for this purpose. Use of the insulating plate facilitates manufacturing of the nano-tube and reduces a manufacturing cost thereof, as compared with use of the graphite plate.

Further, the metal layer may be made in the form of a thick film by screen printing or the like or a thin film by CVD, mask deposition or the like. The metal layer may also act as a wiring layer which permits the nano-tube to carry out electron emission due to application of a potential thereto, when the nano-tube is used as an electron emission source.

Moreover, the metal catalyst 15 may be arranged in a solid pattern on the arc-treated material 2 or patterned as desired. The graphite layer and metal layer also may be formed in a solid pattern. Alternatively, they may be patterned in correspondence to a pattern of the metal catalyst 15. The metal catalyst 15 may be deposited in the form of a thin film by CVD, mask deposition or the like.

In the embodiment described above, the nano-tube formed on the substrate or arc-treated material 2 is applied to the electron emission source without being subjected to any further processing. Alternatively, the nano-tube may be separated from the substrate or arc-treated material 2 and purified, followed by application in the form of an elemental nano-tube to the electron emission source.

The nano-tube manufactured by the method according to the present invention may be used for a material for occluding hydrogen or the like.

Also, the nano-tube manufactured by the method of the present invention may be added in the form of a mixture to an electrode of a secondary battery, used for an electrode of a secondary battery, or added in the form of a mixture to a fuel cell.

Further, the nano-tube manufactured by the method of the present invention may be added in the form of a mixture to a material such as rubber, plastic, resin, iron steel, concrete or the like. Such addition of the nano-tube leads to an improvement in strength of the material, thermal conductivity thereof, electric conductivity thereof or the like.

Moreover, the nano-tube manufactured by the method of the present invention is featured in that a nano-horn as well as a single-layer nano-tube is contained in soot. The term "nano-horn" as used herein is intended to mean a carbon nano-particle formed into a configuration like that obtained by conically rounding a graphite sheet (see, K. Murata, K. Kaneko, F. Kokai, K. Takahashi, M. Yudasaka and S. lljima, "Pore Structure of Single-Wall Carbon Nanohorn Aggregates", Chem. Phys. Lett. 331: 14–20 (2000)).

As can be seen form the foregoing, the present invention provides a method for manufacturing a nano-tube which is highly readily practiced.

Also, the present invention provides a method for manufacturing an electron emission source which is readily practiced and suitable for continuous mass-production.

Further, the present invention provides a method for manufacturing nano-tubes which readily forms nano-tubes in any desired pattern on at least one site of a substrate.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A method for manufacturing a nano-tube comprising the steps of:
   providing a first electrode and a second electrode to be opposite each other, said second electrode being made of a material including carbon material;
   applying a voltage between said first electrode and said second electrode to carry out arc discharge for a period of three seconds or less between said first electrode and predetermined regions of said second electrode; and
   treating the carbon material on said predetermined regions of said second electrode to the arc discharge so as to transform the carbon material on said predetermined regions of said second electrode into nanotube on a surface of said second electrodes at said predetermined regions.

2. The method defined in claim 1, wherein:
   said step of treating said carbon material on said predetermined region of said electrode is carried out while moving a torch electrode provided at an arc torch of the first electrode and said second electrode relatively to each other.

3. The method as defined in claim 1 or 2, wherein said second electrode is arranged on a surface of a substrate; and
   said step of treating said carbon material on said predetermined region of said second electrode is carried out while said substrate is positioned on a cooling member to cool said substrate through said cooling member.

4. The method as defined in claim 1 or 2, wherein said step of treating said carbon material on said predetermined region of said second electrode is carried out while at least said first electrode, said second electrode and an arc discharge region between said first electrode and said second electrode is surrounded with a surrounding member.

5. The method as defined in claim 1 or 2, wherein said carbon material for said second electrode is any one selected from the group consisting of graphite, carbon, activated carbon, amorphous carbon and graphite.

6. The method as defined in claim 1 or 2, wherein said carbon material for said second electrode is any one selected from the group consisting of a carbon material containing a metal catalyst, that having a metal catalyst formed on a surface thereof, that containing B and a metal catalyst, that having B formed on a surface thereof and that having B and a metal catalyst formed on a surface thereof.

7. The method as defined in claim 6, wherein said metal catalyst is selected from the group consisting of Li, B, Mg, Al, Si, P, S, K, Ca, Ti, V, Cr, Mn, Fe, Co, Ni, Cu, Zn, Ga, Ge, As, Y, Zr, Nb, Mo, Rh, Pd, In, Sn, Sb, La, Hf, Ta, W, Os, Pt, an oxide thereof, a nitride thereof, a carbide thereof, a sulfide thereof, a chloride thereof, a sulfate thereof, a nitrate thereof and a mixture thereof.

8. The method as defined in any one of claims 1 and 2, wherein said arc discharge is carried out while feeding a specific gas to a region in which said arc discharge is generated.

9. The method as defined in claim 8, wherein said specific gas is selected from the group consisting of Ar, He, air, nitrogen gas, carbon dioxide gas, oxygen gas, hydrogen gas and a mixture thereof.

10. The method as defined in claim 1 or 2, wherein said first electrode is made of a material including graphite, activated carbon and amorphous carbon.

11. The method as defined in claim 1 or 2, wherein said arc discharge is generated by a DC or a DC pulse; and
    said second electrode acts as an anode for said arc discharge.

12. The method as defined in claim 1 or 2, wherein said arc discharge is generated by an AC or an AC pulse.

13. A method for manufacturing a nano-tube comprising the steps of:
    providing a first electrode and a second electrode to be opposite each other, said second electrode being made of a material including carbon material;
    applying a voltage between said first electrode and said second electrode to generate arc discharge for a period of three seconds or less between said first electrode and predetermined regions of said second electrode; and
    treating the carbon material on said predetermined regions of said second electrode to the arc discharge so as to transform the carbon material on said predetermined regions of said second electrode in to nano-tube on a surface of said second electrode at said predetermined regions while moving a torch electrode provided at an arc torch of said first electrode and second electrode relatively to each other.

14. A method for manufacturing a nano-tube comprising the steps of:
    providing a first electrode and a second electrode to be opposite each other, said second electrode being made of a material including carbon material having a predetermined metal catalyst pattern;
    applying a voltage between said first electrode and said electrode to generate arc discharge for a period of three seconds or less between said first electrode and predetermined regions of said second electrode; and treating the carbon material on said predetermined regions of said second electrode to the arc discharge so as to transform the carbon material on said predetermined regions of said second electrode in to nano-tube on a surface of said second electrode at said predetermined regions.

15. A method for manufacturing a nano-tube comprising the steps of:

providing a first electrode and a second electrode to be opposite each other, said second electrode being made of a material including carbon material;

providing a mask having openings, said mask separated from and above a surface of said second electrode:

applying a voltage between said first electrode and said electrode to generate arc discharge for a period of three seconds or less between said first electrode and predetermined regions of said second electrode; and treating the carbon material on said predetermined regions of said second electrode to the arc discharge so as to transform the carbon material on said predetermined regions of said second electrode in to nano-tube on a surface of said second electrode at said predetermined regions.

16. The method as defined in any one of claims 13 and 15, wherein said first electrode comprises a torch electrode provided at an arc torch.

17. The method as defined in claim 14, wherein said carbon material contains a metal catalyst.

18. The method as defined in claim 17, wherein said metal catalyst is formed on a surface of said carbon material.

* * * * *